United States Patent
Jung et al.

[11] Patent Number: 5,970,822
[45] Date of Patent: Oct. 26, 1999

[54] UNIDIRECTIONAL OUTPUT FROM BI-DIRECTIONAL INPUTS BICYCLE TRANSMISSION

[75] Inventors: Jae Yeon Jung, 683-43, Hannam 2-dong, Yongsan-ku, Seoul 140-212; Chun Kil Park, Seoul, both of Rep. of Korea

[73] Assignee: Jae Yeon Jung, Seoul, Rep. of Korea

[21] Appl. No.: 09/147,515

[22] PCT Filed: May 14, 1998

[86] PCT No.: PCT/KR98/00120

§ 371 Date: Mar. 15, 1999

§ 102(e) Date: Mar. 15, 1999

[87] PCT Pub. No.: WO98/51561

PCT Pub. Date: Nov. 19, 1998

[30] Foreign Application Priority Data

May 15, 1997 [KR] Rep. of Korea .................. 97-10742 U
Mar. 23, 1998 [KR] Rep. of Korea ...................... 98-10004

[51] Int. Cl.$^6$ ............................. F16H 3/14; B62M 11/16
[52] U.S. Cl. ........................ 74/810.1; 475/12; 280/236
[58] Field of Search .................................... 280/236, 237; 74/810.1; 475/12

[56] References Cited

U.S. PATENT DOCUMENTS

| | | |
|---|---|---|
| 743,867 | 11/1903 | Head . |
| 1,275,505 | 8/1918 | Veyret . |
| 4,137,789 | 2/1979 | Herleth ................................ 74/810.1 X |
| 4,422,786 | 12/1983 | Piptone ............................... 74/810.1 X |
| 4,501,169 | 2/1985 | Stiline ................................ 74/810.1 X |
| 5,609,074 | 3/1997 | Venaas ..................................... 74/810.1 |

FOREIGN PATENT DOCUMENTS 34 44 140 A1  6/1986  Germany .
2 263 511  7/1993  United Kingdom .

*Primary Examiner*—Khoi Q. Ta
*Attorney, Agent, or Firm*—Bacon & Thomas, PLLC

[57] ABSTRACT

A reversible drive device for bicycles, allowing a bicycle to go forward by a normal or reversed rotating force of a pedal without forcing a user to operate any lever, is disclosed. The drive device has a simple construction with a reduced number of parts and allows the rear wheel 10 to be rotatable in a reversed direction, thus allowing the bicycle to be moved backward. The drive device is integrated into a single assembly and is detachably attached to either the rear wheel hub shaft 11 or a pedal shaft 21, so the device allows a user to easily repair or change the drive device and improves work efficiency while producing the drive device. Two crescent stoppers 18 are formed on each end of the fixed shaft 17 so as to effectively prevent the shaft holding yoke of the rear wheel fork 1 from being unexpectedly opened.

8 Claims, 8 Drawing Sheets

UNIDIRECTIONAL OUTPUT FROM BI-DIRECTIONAL INPUTS BICYCLE TRANSMISSION

TECHNICAL FIELD

The present invention relates, in general, to reversible bicycles capable of going forward on the ground powered by the reversed rotating force of a pedal shaft in addition to the normal rotating force and, more particularly, to a reversible drive device for such bicycles.

BACKGROUND ART

As well known to those skilled in the art, typical bicycles, preferably used for leisure sport, short-distance locomotion, etc., individually comprise a pipe frame with both a saddle and a handlebar. In such a bicycle, front and rear wheels are rotatably held by two forks at the front and rear ends of the frame with shafts and bearings. The frame also holds a one-way drive device comprising two sprockets: a large-diameter drive sprocket and a small-diameter ratchet sprocket. The drive sprocket has a shaft, which is provided with two pedals at both ends and is rotatably fitted into the fixed bush of the frame. The ratchet sprocket is held by the frame at the center of the rear wheel and is connected to the drive sprocket through an endless chain. The ratchet sprocket is provided with a ratchet mechanism or a one-way clutch for exclusively transmitting the normal rotating force of the drive sprocket to the shaft of the rear wheel. That is, when a user, sitting on the saddle and gripping the handlebar with both hands, pedals to rotate the drive sprocket in a normal direction, the normal rotating force of the drive sprocket is transmitted to the ratchet sprocket through the chain prior to being transmitted to the rear wheel, thus rotating the rear wheel and making the bicycle go forward on the ground. However, when the drive sprocket is rotated in a reversed direction, the one-way clutch of the ratchet sprocket does not transmit the reversed rotating force of the drive sprocket to the rear wheel, but allows the ratchet sprocket to be run idle. In such a case, the bicycle inertially goes forward for a time.

However, such a one-way drive device for bicycles is problematic in that the drive sprocket has to be continuously rotated in the normal direction when the bicycle requires going forward. It is thus necessary for a user to continuously pedal the bicycle forward while riding on the bicycle. Therefore, in the case of a long-distance bicycle trip, both legs of the user suffer from tension, causing the user to feel stiff in the legs and preventing the leg muscles from being uniformly developed and reducing the muscular motion effect while riding on the bicycle. In addition, when the user dismounts from the bicycle and walks on the ground after a long-time pedaling, the leg muscles, which have tension due to the unidirectional pedaling, fail to directly adapt themselves to walking thus causing the user to stagger on the ground. In this regard, a user sometimes stops the pedalling of a bicycle or pedals the bicycle in a reversed direction. However, such a reversed rotating force of the drive sprocket is not transmitted to the rear wheel due to the one-way clutch and results in a consumption of user's pedalling force.

In an effort to overcome the above problems caused by such a one-way drive device for bicycles, Korean Patent Publication No. 95-13589 discloses a reversible drive device for bicycles, which is capable of making a bicycle to go forward on the ground by the reversed rotating force of a pedal shaft in addition to the normal rotating force. The above Korean reversible drive device effectively transmits the rotating force of a pedal shaft to the rear wheel regardless of the rotating direction of the shaft, thereby making the bicycle go forward when a user rotates the pedal shaft in either direction. The above reversible drive device comprises a frame, which is provided with a mount bracket for holding a drive sprocket on the frame. The drive device also has a drive power transmission unit a power conversion unit and a switch lever unit. The power transmission unit is used for transmitting the rotating force of a pedal shaft to the drive sprocket. The power conversion unit is selectively brought into detachable engagement with the power transmission unit, thus changing a reversed rotating force of the pedal shaft into a normal rotating force prior to transmitting the rotating force to the drive sprocket. The switch lever unit is selectively operated by a user to change the drive mode of the reversible drive device between two modes: a normal pedalling mode and a reversed pedalling mode. In the normal pedalling mode, the power transmission unit is free from the power conversion unit, so the power transmission unit transmits the normal rotating force of the pedal shaft to the drive sprocket. In the reversed pedalling mode, the power conversion unit engages with the power transmission unit, thus changing the reversed rotating force of the pedal shaft into a normal rotating force prior to transmitting the rotating force to the drive sprocket.

That is, when the switch lever unit is operated by a user to change the drive mode into the reversed pedalling mode, the power conversion unit is brought into engagement with the power transmission unit, so the reversed rotating force of the pedal shaft is changed into the normal rotating force, thus rotating the power transmission unit in a normal direction. Therefore, the above reversible drive device allows a bicycle to go forward regardless of the rotating direction of the pedal shaft.

However, the above reversible drive device for bicycles is problematic in that when a user wants to change the drive mode of the drive device between the two modes while riding on a bicycle, the user has to operate the switch lever unit. Therefore, the reversible drive device is inconvenient to the user.

The reversible drive device is also designed so that it reduces the speed ratio during the reversed pedalling mode where the rotating force of the pedal shaft is transmitted to the power transmission unit through the power conversion unit. Therefore, the reversible drive device reduces the speed of a bicycle during the reversed pedalling made in comparison with the normal pedalling mode. Another problem experienced in the above reversible drive device is that the power conversion unit and the power transmission unit individually have a complex construction and comprise a plurality of elements, thus complicating the process of producing bicycles. Therefore, the above reversible drive device reduces productivity and increases production cost of bicycles.

DISCLOSURE OF THE INVENTION

Accordingly, the present invention has been made keeping inn mind the above problems occurring in the prior art, and an object of the present invention is to provide a reversible drive device for bicycles, which allows a bicycle to go forward by a normal or reversed rotating force of a pedal without forcing a user to operate any lever, thus being convenient to the user riding on the bicycle.

It is another object of the present invention to provide a reversible drive device for bicycles, which has a simple construction with a reduced number of parts, thus being produced through a simple process, improving productivity and reducing the production cost.

It is a further object of the present invention to provide a reversible drive device for bicycles, which allows the rear wheel of a bicycle to be rotatable in a reversed direction, thus easily moving the bicycle backward.

It is yet another object of the present invention to provide a reversible drive device for bicycles, which is integrated into a single assembly and is detachably attached to either the rear wheel hub shaft or a pedal shaft, thus allowing a user to easily repair or change the drive device and allowing a bicycle manufacturer to easily manage the parts of bicycles, and improving work efficiency while producing the drive device.

It is still another object of the present invention is to provide a reversible drive device for bicycles, which is provided with a means for effectively preventing the shaft holding yoke of a rear wheel fork from being unexpectedly opened, thus improving the durability of bicycles.

In order to accomplish the above object, a reversible drive device for bicycles according to the primary embodiment of the present invention comprises: a driven sprocket detachably and rotatably installed at one side of a bicycle's rear wheel at a position spaced apart from the rear wheel, the driven sprocket being connected to a drive sprocket of a pedal through a chain and rotating the rear wheel using the rotating force of the pedal, and being shaped into a ring gear with internal and external teeth; a hub shaft is fixed to the center of the rear wheel and rotatably fitted over a fixed shaft, thus rotatably supporting the rear wheel on the fixed shaft; a rear wheel gear detachably held on the hub shaft so as to be rotatable around the fixed shaft along with the hub shaft, the rear wheel gear being eccentrically arranged in a concentric cavity of the driven sprocket with an eccentric gap being formed between the rear wheel gear and the driven sprocket, the rear wheel gear thus transmitting the rotating force of the driven sprocket to the rear wheel; a fixed intermediate gear having a fixed shaft and arranged in the eccentric gap and always engaging with the external teeth of the rear wheel gear; a movable intermediate gear having a movable shaft and arranged in the eccentric gap in a way such that the movable intermediate gear always engages with the internal teeth of the driven sprocket and is movable between two positions: a first position where the movable intermediate gear engages with both the driven sprocket and the fixed intermediate gear so as to rotate the rear wheel gear in a normal direction, and a second position where the movable intermediate gear engages with both the driven sprocket and the rear wheel gear so as to rotate the rear wheel gear in the normal direction, the movable intermediate gear being placed at the first position when the driven sprocket is rotated in the normal direction due to a normal rotating force of the pedal, and being placed at the second position when the driven sprocket is rotated in a reversed direction due to a reversed rotating force of the pedal; and a fixed bracket having an arcuate guide slot on the inside surface and fixedly mounted to the fixed shaft of the rear wheel, and holding the rear wheel gear, the driven sprocket and the two intermediate gears, the guide slot being exposed to the eccentric gap and having the same radius of curvature as that of an internally toothed surface of the driven sprocket and movably holding the movable shaft of the movable intermediate gear, thus allowing the movable intermediate gear to be movable between the first and second positions in accordance with a rotating direction of the driven sprocket.

The driven sprocket may be formed as a sprocket assembly with a plurality of sprockets having different diameters, thus allowing the rotating speed of the pedal to be changeable when the rotating force of the pedal is transmitted to the driven sprocket.

In another embodiment, the reversible drive device comprises: a drive sprocket detachably and rotatably installed at one side of a pedal shaft at a position spaced apart from the pedal shaft, the drive sprocket being connected to a driven sprocket of a rear wheel through a chain and rotating the rear wheel using the rotating force of a pedal, and being shaped into a ring gear with internal and external teeth; a pedal gear detachably held on the pedal shaft so as to be rotatable along with the pedal shaft, the pedal gear being eccentrically arranged in a concentric cavity of the drive sprocket with an eccentric gap being formed between the pedal gear and the drive sprocket, the pedal gear thus transmitting the rotating force of the pedal shaft to the drive sprocket; a fixed intermediate gear having a fixed shaft and arranged in the eccentric gap and always engaging with the internal teeth of the drive sprocket; a movable intermediate gear having a movable shaft and arranged in the eccentric gap in a way such that the movable intermediate gear always engages with the external teeth of the pedal gear and is movable between two is positions: a first position where the movable intermediate gear engages with both the pedal gear and the fixed intermediate gear so as to rotate the drive sprocket in a normal direction, and a second position where the movable intermediate gear engages with both the pedal gear and the internal teeth of the drive sprocket so as to rotate the drive sprocket in the normal direction, the movable intermediate gear being placed at the first position when the pedal gear is rotated in the normal direction due to a normal rotating force of the pedal, and being placed at the second position when the pedal gear is rotated in a reversed direction due to a reversed rotating force of the pedal; and a fixed bracket having an arcuate guide slot on the inside surface and fixedly mounted to the pedal shaft, and holding the pedal gear, the drive sprocket and the two intermediate gears, the guide slot being exposed to the eccentric gap and having the same radius of curvature as that of an externally toothed surface of the pedal gear and movably holding the movable shaft of the movable intermediate gear, thus allowing the movable intermediate gear to be movable between the first and second positions in accordance with a rotating direction of the pedal gear.

In a further embodiment, the movable intermediate gear consists of two gears having different diameters and being commonly and fixedly mounted to the movable shaft.

In still another embodiment, the reversible drive device further comprises: first additional intermediate gear having a fixed shaft and arranged in the eccentric gap at a position opposite to the fixed intermediate gear, and always engaging with the internal teeth of the drive sprocket; and a second additional intermediate gear having a fixed shaft and arranged in the eccentric gap, and always engaging with the first additional intermediate gear without engaging with the pedal gear or the drive sprocket, the second additional intermediate gear being selectively brought into engagement with the movable intermediate gear when the pedal gear is rotated in the reversed direction.

In yet another embodiment, the arcuate guide slot of the fixed bracket is fully perforated, thus forming an arcuate guide slit, the movable shaft of the movable intermediate gear is lengthened and penetrates the arcuate guide slit with a rod being vertically mounted to an outside end of the movable shaft so as to rotatable support the movable shaft, and a magnet is fixedly mounted to a lower end portion of the rod and comes into contact with the pedal shaft, thus being rotatable in the same direction as that of the pedal shaft and allowing the movable shaft of the movable intermediate gear to be more effectively movable.

BRIEF DESCRIPTION OF THE DRAWINGS

The above and other objects, features and other advantages of the present invention will be more clearly understood from the following detailed description taken in conjunction with the accompanying drawings, in which.

BEST MODE FOR CARRYING OUT THE INVENTION

Figure 1:
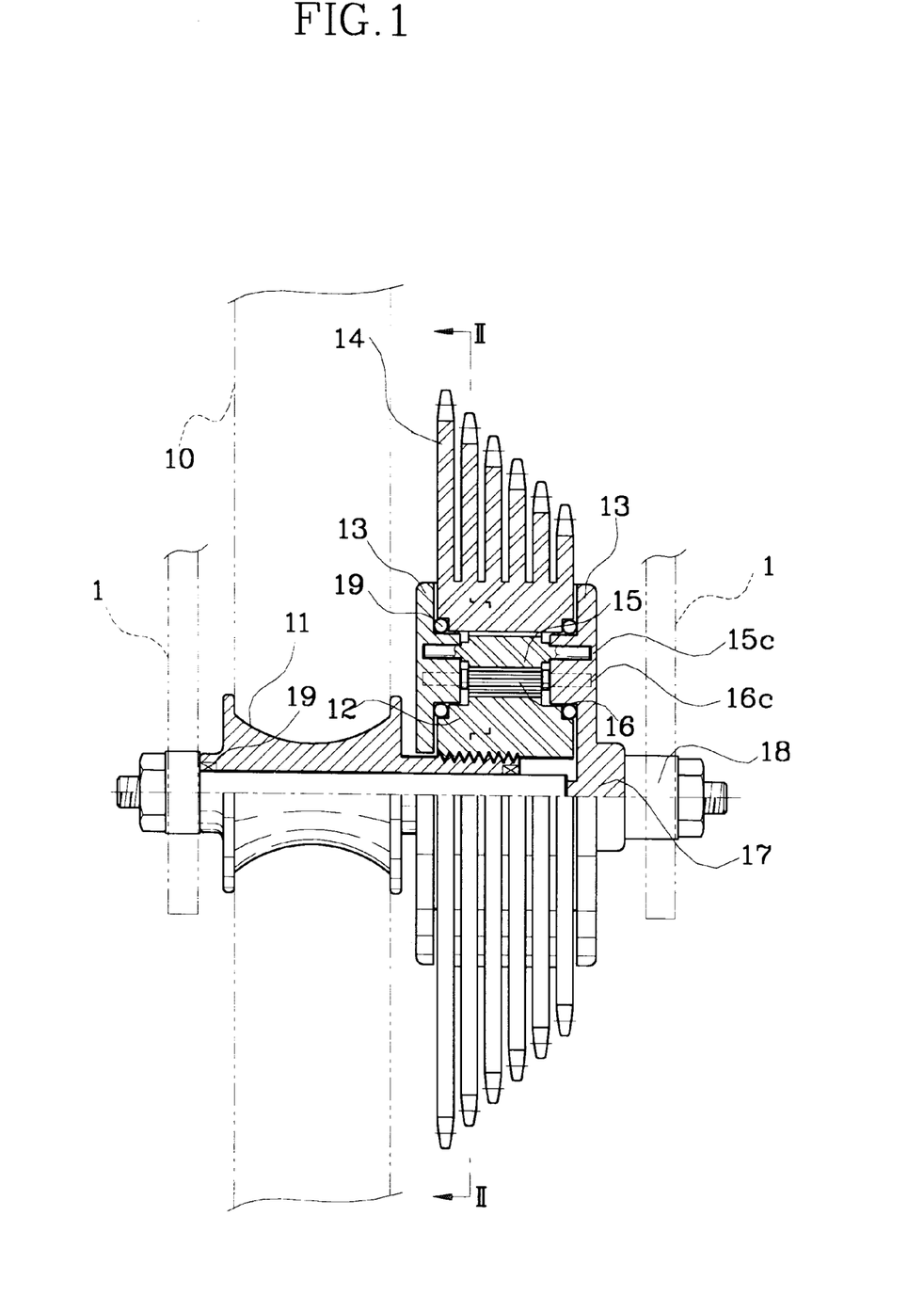
FIG. 1 is a partially sectioned view of a reversible drive device for bicycles in accordance with the primary embodiment of the invention, the drive device being mounted to a rear wheel hub shaft of a bicycle.
Figure 2:
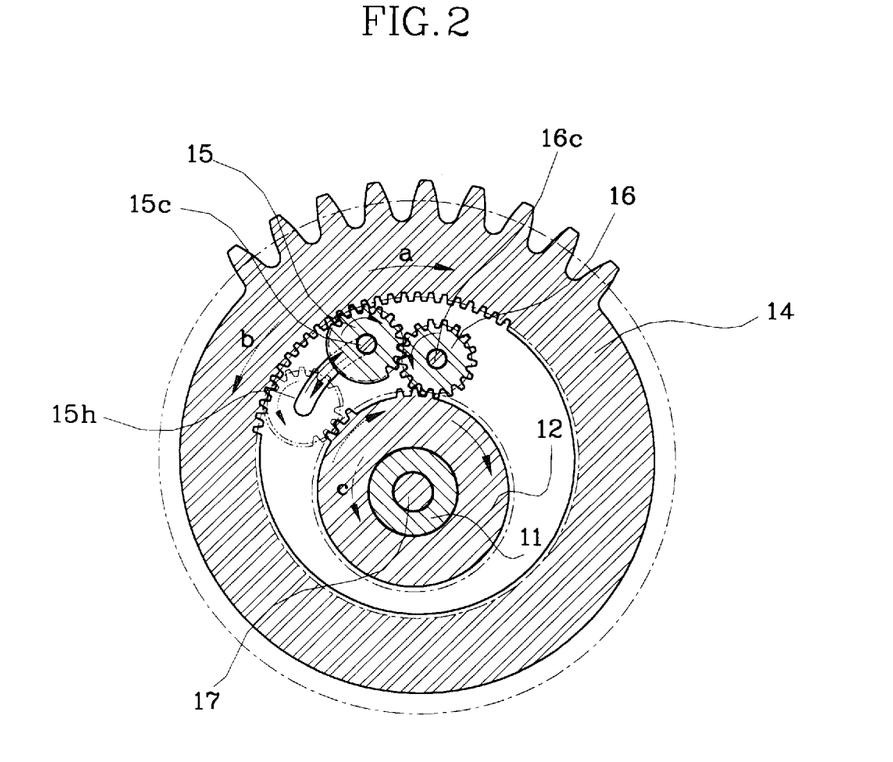
FIG. 2 is a sectional view of the above reversible drive device taken along the II—II of FIG. 1.
Figure 3:
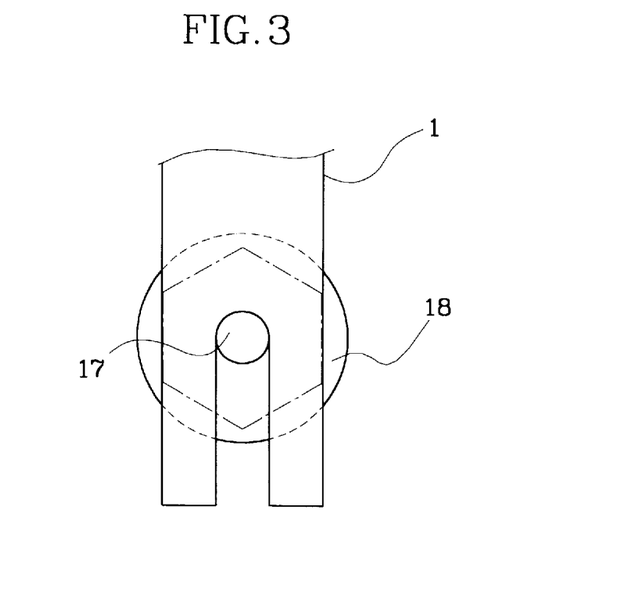
FIG. 3 is a side view of a means for preventing the shaft holding yoke of a rear wheel fork from being unexpectedly opened.

FIG. 1 is a partially sectioned view of a reversible drive device for bicycles in accordance with the primary embodiment of the invention, the drive device being mounted to a rear wheel hub shaft of a bicycle. FIG. 2 is a sectional view of the above reversible drive device taken along the line II—II of FIG. 1. FIG. 3 is a side view of a means for preventing the shaft holding yoke of a rear wheel fork from being unexpectedly opened.

The reversible drive device of this invention may be mounted to either a pedal shaft or a rear wheel hub shaft of a bicycle without affecting the functioning of this invention.

In the primary embodiment of FIGS. 1 to 3, the reversible drive device is mounted to the rear wheel hub shaft 11 of a bicycle. As shown in FIGS. 1 to 3, the reversible drive device according to the primary embodiment is designed to transmit the rotating force of a pedal 2 to a rear wheel 10 and comprises a driven sprocket 14, the rear wheel hub shaft 11, a rear wheel gear 12, a fixed bracket 13, a fixed intermediate gear 16 with a fixed shaft 16c, and a movable intermediate gear 15 with a movable shaft 15c. In the operation of the above drive device, the rotating force of the pedal 2 passes through a drive sprocket, a chain, the driven sprocket 14, at least one of the two intermediate gears 15 and 16, the rear wheel gear 12 and the hub shaft 11 in order prior to being transmitted to the rear wheel 10.

The driven sprocket 14 is detachably and rotatably installed at one side of the center of the rear wheel 10 at a position spaced apart from the rear wheel 10. The driven sprocket 14 is also connected to the drive sprocket through the chain and is designed to rotate the rear wheel 10 in a normal direction using the rotating force of the pedal 2 regardless of a rotating direction of the pedal 2. The above driven sprocket 14 is shaped into a ring gear with internal and external teeth.

The hub shaft 11 is fixed to the center of the rear wheel 10 and is rotatably fitted over a fixed shaft 17 or a center shaft of the rear wheel 10, thus rotatably supporting the rear wheel 10 on the fixed shaft 17.

The rear wheel gear 12 is detachably held on the hub shaft 11 so as to be rotatable around the fixed shaft 17 along with the hub shaft 11 The above rear wheel gear 12 is eccentrically arranged in a concentric cavity of the driven sprocket 14 with an eccentric gap being formed between the gear 12 and the sprocket 14, so the rear wheel gear 12 is eccentric from the central axis of the driven sprocket 14. The above rear wheel gear 12 transmits the rotating force of the driven sprocket 14 to the rear wheel 10.

The fixed intermediate gear 16, with the fixed shaft 16c, is arranged in the eccentric gap between the rear wheel gear 12 and the driven sprocket 14 and always engages with the external teeth of the rear wheel gear 12.

Meanwhile, the movable intermediate gear 15, with the movable shaft 15c, is arranged in the above eccentric gap in a way such that the gear 15 always engages with the internal teeth of the driven sprocket 14 and is movable between two positions: a first position and a second position, due to the shaft 15c being movable within a distance in the same direction as that of the driven sprocket 14. The movable intermediate gear 15 is placed at the first position when the driven sprocket 14 is rotated in a normal direction due to a normal rotating force of the pedal 2. That is, when the pedal 2 is rotated in a normal direction so as to rotate the driven sprocket 14 in the normal direction, the movable intermediate gear 15 is placed at the first position where the gear 15 engages with both the driven sprocket 14 and the fixed intermediate gear 16, thus allowing the rear wheel gear 12 with rear wheel 10 to be rotated in the normal direction. Meanwhile, the movable intermediate gear 15 is placed at the second position when the driven sprocket 14 is rotated in a reversed direction due to a reversed rotating force of the pedal 2. That is, when the pedal 2 is rotated in a reversed direction so as to rotate the driven sprocket 14 in the reversed direction, the movable intermediate gear 15 is moved to the second position where the gear 15 engages with both the driven sprocket 14 and rear wheel gear 12, thus allowing the rear wheel gear 12 with the rear wheel 10 to be rotated in a normal direction opposite to that of the pedal 2.

The fixed bracket 13 has an arcuate guide slot 15h on the inside surface. The above guide slot 15h is exposed to the eccentric gap between the rear wheel gear 12 and the driven sprocket 14 and has the same radius of curvature as that of the internally toothed surface of the driven sprocket 14. The above guide slot 15h receives and movably holds the shaft 15c of the movable intermediate gear 15, so the shaft 15c, with the movable intermediate gear 15 always engaging with the internal teeth of the driven sprocket 14, is movable between the first and second positions in accordance with a rotating direction of the driven sprocket 14. The fixed bracket 13 is fixedly mounted to the fixed shaft 17 and holds the rear wheel gear 12, the driven sprocket 14 and the two intermediate gears 15 and 16.

In the present invention, it is preferable to form the driven sprocket 14 as a sprocket assembly with a plurality of sprockets having different diameters, thus allowing the rotating speed of the pedal 2 to be changeable when the rotating force of the pedal 2 is transmitted to the sprocket 14. In the embodiments of FIGS. 1 to 3, the driven sprocket 14 is formed as, for example, a sprocket assembly with six sprockets having different diameters.

The chain (not shown) is wrapped around the drive and driven sprockets, thus transmitting the rotating force of the pedal 2 to the rear wheel 10 through the drive and driven sprockets. A plurality of bearings 19 are provided at the junction between the rear wheel gear 12, the fixed bracket 13 and the driven sprocket 14, thus effectively reducing power loss due to frictional contact at the junction.

The rear wheel gear 12 is preferably screwed to the hub shaft 11 in the same direction as the rotating direction of the rear wheel gear 12. In order to prevent the shaft holding yoke of the rear wheel fork 1 from being unexpectedly opened, each end of the fixed shaft 17 is partially depressed at the center, thus forming a yoke seat having two crescent stoppers 18 at diametrically opposite positions as shown in FIG. 3. The fixed shaft 17 is positioned in the web of the yoke which is stably seated In the yoke seat of the shaft 17 and is supported by the two crescent stoppers 18 at both sides. After seating the fixed shaft 17 as described above, the shaft 17 is tightened to the rear wheel fork 1 by two nuts at both ends, thus being secured to the fork 1.

The above reversible drive device, mounted to the rear wheel hub shaft 11 according to the primary embodiment, is operated as follows.

That is, when a user, riding on a bicycle, rotates the pedal 2 in a normal direction, the normal rotating force of the pedal 2 is transmitted to the driven sprocket 14 through a chain, thus rotating the driven sprocket 14 in the same direction or the normal direction as shown by the arrow "a" of FIG. 2. In such a case, the movable intermediate gear 15, having the movable shaft 15c and engaging with the internal teeth of the driven sprocket 14, is moved from the second position to the first position under the guide of the arcuate guide slot of the fixed bracket 13, thus being brought into engagement with the fixed intermediate gear 16. At the first position, the normal rotating force of the driven sprocket 14 is transmitted to the rear wheel gear 12 through the two intermediate gear 15 and 16. That is, the movable intermediate gear 15 at the first position is rotated in the normal direction, while the fixed intermediate gear 16 is rotated in a reversed direction as shown by the arrows of FIG. 2. Due to the reversed rotating action of the fixed intermediate gear 16, the rear wheel gear 12, engaging with the fixed intermediate gear 16 at the external teeth, is rotated in the normal direction. In a brief description, when the driven sprocket 14 is rotated in the normal direction as shown by the arrow "a" of FIG. 2, the rear wheel gear 12 is rotated In the normal direction a long with the rear wheel hub shaft 11.

Meanwhile, when the user rotates the pedal 2 in a reversed direction, the reversed rotating force of the pedal 2 is transmitted to the driven sprocket 14 through the chain, thus rotating the driven sprocket 14 in the same direction or the reversed direction as shown by the arrow "b" of FIG. 2. In such a case, the movable intermediate gear 15 is moved from the first position to the second position under the guide of the arcuate guide slot 15h of the fixed bracket 13, thus being brought into engagement with the rear wheel gear 12 without engaging with the fixed intermediate gear 16. At the second position, the movable Intermediate gear 15, rotated in the reversed direction, allows the rear wheel gear 12 to be rotated in the normal direction as shown by the arrows of FIG. 2. In a brief description, when the driven sprocket 14 is rotated in the reversed direction as shown by the arrow "b" of FIG. 2, the rear wheel gear 12 is rotated in the normal direction along with the rear wheel hub shaft 11.

The above reversible drive device does not affect a reversed rotating action of the rear wheel 10, thus allowing a user to easily move the bicycle backward. That is, when the user moves the bicycle backward, the rear wheel gear 12 is rotated In a reversed direction along with the hub shaft 11 as shown by the arrow "c" of FIG. 2. In such a case, the movable shaft 15c, received in the arcuate guide slot 15h, is not operated in conjunction with the reversed rotating action of the hub shaft 11 or the rear wheel gear 12, so the rear wheel gear 12 can be freely rotated in the reversed direction along with the hub shaft 11 and allows the bicycle to be freely moved backward.

Therefore, the reversible drive device according to the primary embodiment of this invention does not force a user to operate any lever when it is necessary to move a bicycle backward.

Figure 4:
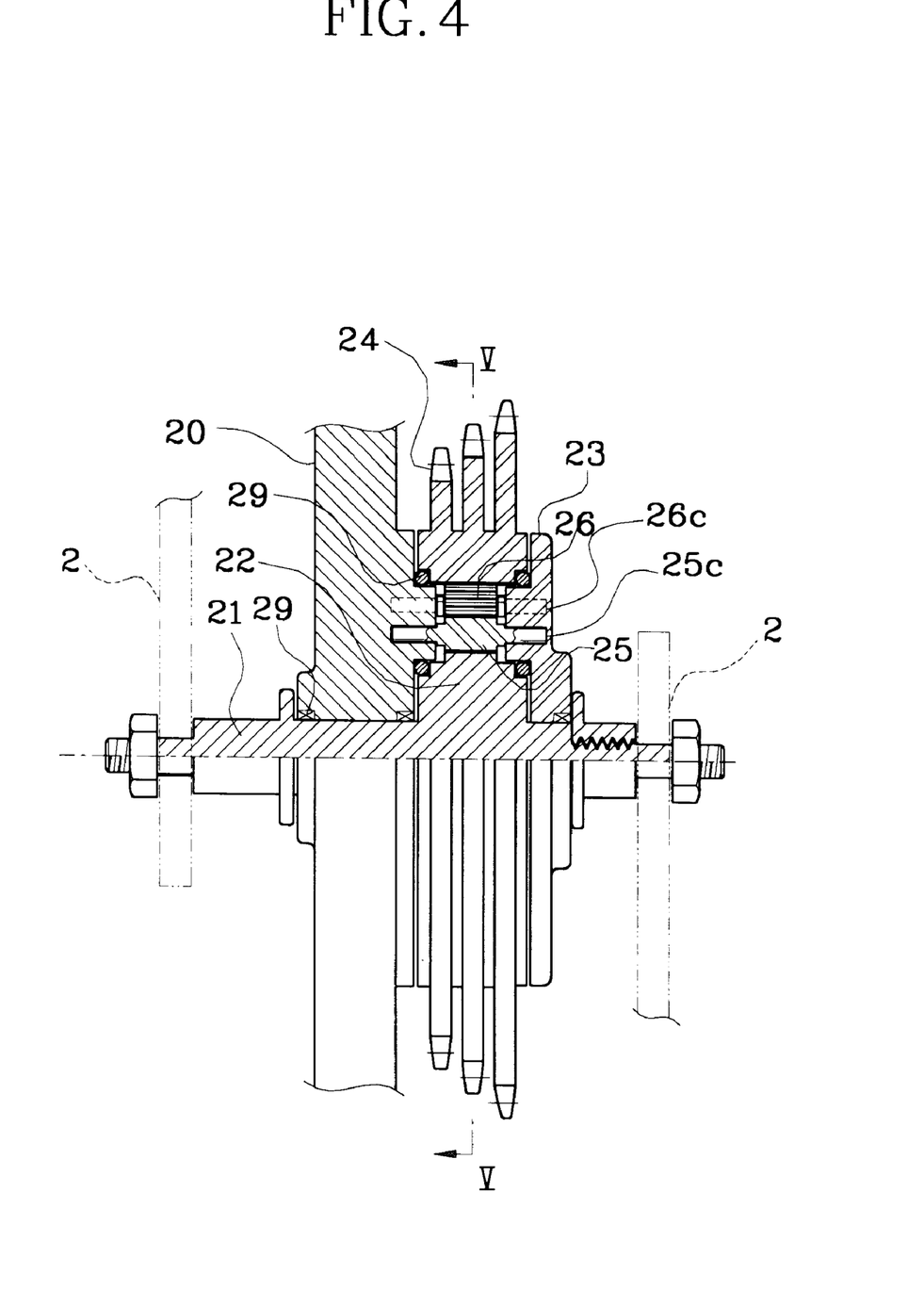
FIG. 4 is a partially sectioned view of a reversible drive device for bicycles in accordance with the second embodiment of the invention, the drive device being mounted to a pedal shaft of a bicycle.
Figure 5:
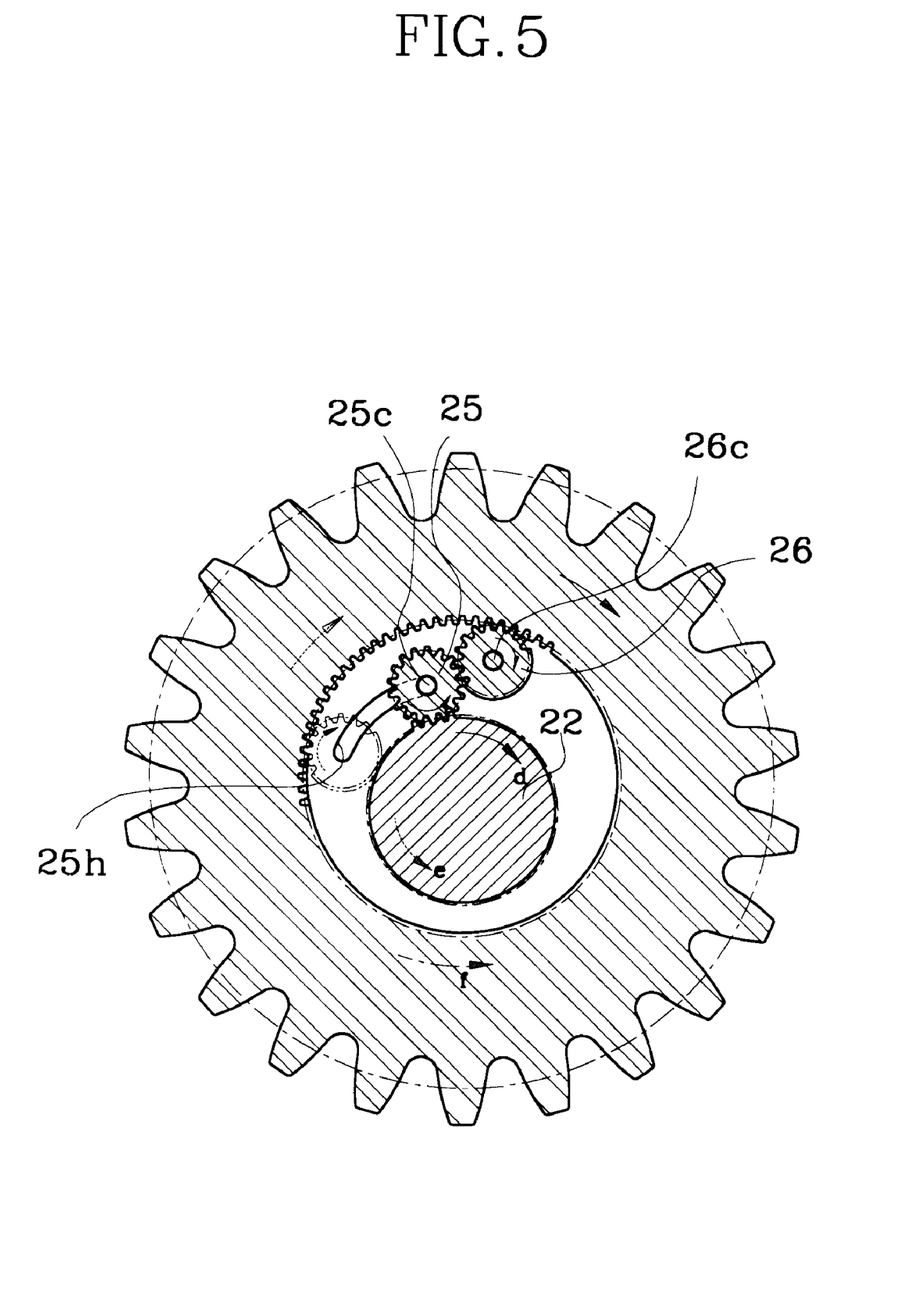
FIG. 5 is a sectional view of the above reversible drive device taken along the line V—V of FIG. 4.

FIG. 4 is a partially sectioned view of a reversible drive device for bicycles in accordance with the second embodiment of the invention. FIG. 5 is a sectional view of the above reversible drive device taken along the line V—V of FIG. 4. The reversible drive device of this embodiment is mounted to a pedal shaft 21 in place of the rear wheel hub shaft 11 different from the primary embodiment.

As shown in FIGS. 4 and 5, the reversible drive device according to the second embodiment is designed to transmit the rotating force of a pedal 2 to a rear wheel and comprises a drive sprocket 24, a pedal gear 22, a fixed bracket 23, a fixed intermediate gear 26 with a fixed shaft 26c, and a movable intermediate gear 25 with a movable shaft 25c. In the operation of the above drive device, the rotating force of the pedal 2 passes through the pedal gear 22, at least one of the two intermediate gears 25 and 26, the drive sprocket 24, a chain, a driven sprocket and a rear wheel hub shaft in order prior to being transmitted to the rear wheel.

The drive sprocket 24 is detachably and rotatably installed at one side of the pedal shaft 21 at a position spaced apart from the pedal shaft 21. The drive sprocket 24 is also connected to the driven sprocket through the chain and is designed to rotate the rear wheel 10 in a normal direction using the rotating force of the pedal 2 regardless of a rotating direction of the pedal 2. The above drive sprocket 24 is shaped into a ring gear with internal and external teeth.

The pedal gear 22 is detachably held on the pedal shaft 21 so as to be rotatable along with the shaft 21. The above pedal gear 22 is eccentrically arranged in a concentric cavity of the drive sprocket 24 with an eccentric gap being formed between the gear 22 and the sprocket 24, so the pedal gear 22 is eccentric from the central axis of the drive sprocket 24. The above pedal gear 22 transmits the rotating force of the pedal 2 to the drive sprocket 24.

The fixed intermediate gear 26, with the fixed shaft 26c, is arranged in the eccentric gap between the pedal gear 22 and the drive sprocket 24 and always engages with the internal teeth of the drive sprocket 24.

Meanwhile, the movable intermediate gear 25, with the movable shaft 25c, is arranged in the above eccentric gap in a way such that the gear 25 always engages with the external teeth of the pedal gear 22 and is movable between two positions: a first position and a second position, due to the shaft 25c being movable within a distance in the same direction as that of the pedal gear 22 The movable intermediate gear 25 is placed at the first position when the pedal gear 22 is rotated in a normal direction due to a normal rotating force of the pedal 2. That is, when the pedal 2 is rotated in a normal direction so as to rotate the pedal gear 22 in the normal direction, the movable intermediate gear 25 is placed at the first position where the gear 25 engages with both the pedal gear 22 and the fixed intermediate gear 26, thus allowing the drive sprocket 24 to be rotated in the normal direction. Meanwhile, the movable intermediate gear 25 is placed at the second position when the pedal gear 22 is rotated in a reversed direction due to a reversed rotating force of the pedal 2. That is, when the pedal 2 is rotated in a reversed direction so as to rotate the pedal gear 22 in the reversed direction, the movable intermediate gear 25 is moved to the second position where the gear 25 engages with both the pedal gear 22 and the drive sprocket 24, thus allowing the drive sprocket 24 to be rotated in a normal direction opposite to that of the pedal 2.

The fixed bracket 23 has an arcuate guide slot 25h on the inside surface The above guide slot 25h is exposed to the eccentric gap between the pedal gear 22 and the drive sprocket 24 and has the same radius of curvature as that of the externally toothed surface of the pedal gear 22. The above guide slot 25h receives and movably holds the shaft 25c of the movable intermediate gear 25, so the shaft 25c, with the movable intermediate gear 25 always engaging with the pedal gear 22, is movable between the first and second positions in accordance with a rotating direction of the pedal gear 22. The fixed bracket 23 is fixedly mounted to the pedal shaft 21 and holds the pedal gear 22, the drive sprocket 24 and the two intermediate gears 25 and 26.

In the present invention, it is preferable to form the drive sprocket 24 as a sprocket assembly with a plurality of sprockets having different diameters, thus allowing the rotating speed of the pedal 2 to be changeable when the rotating force of the pedal 2 is transmitted to the driven sprocket through the drive sprocket 24 In the embodiments of FIGS. 4 and 5, the is drive sprocket 24 is formed as, for example, a sprocket assembly with three sprockets having different diameters.

The chain (not shown) is wrapped around the drive and driven sprockets, thus transmitting the rotating force of the pedal 2 to the rear wheel through the drive and driven sprockets. A plurality of bearings 29 are provided at the junction between the pedal gear 22, the fixed bracket 23 and the drive sprocket 24, thus effectively reducing power loss due to frictional contact at the junction.

The above reversible drive device, mounted to the pedal shaft 21 according to the second embodiment, is operated as follows.

That is, when a user, riding on a bicycle, rotates the pedal 2 in a normal direction, the normal rotating force of the pedal 2 is transmitted to the pedal gear 22 through the pedal shaft 21, thus rotating the pedal gear 22 in the same direction or the normal direction as shown by the arrow "d" of FIG. 5. In such a case, the movable intermediate gear 25, having the movable shaft 15c and engaging with the external teeth of the pedal gear 22, is moved from the second position to the first position under the guide of the arcuate guide slot 25h of the fixed bracket 23, thus being brought into engagement with the fixed intermediate gear 26. At the first position, the normal rotating force of the pedal gear 22 is transmitted to the drive sprocket 24 through the two intermediate gears 25 and 26. That is, the movable intermediate gear 25 at the first position is rotated in a reversed direction, while the fixed intermediate gear 26 is rotated in a normal direction as shown by the arrows of FIG. 5. Due to the normal rotating action of the fixed intermediate gear 26, the drive sprocket 24, engaging with the fixed intermediate gear 26 at the internal teeth, is rotated in the normal direction. In a brief description, when the pedal gear 22 is rotated in the normal direction as shown by the arrow "d" of FIG. 5, the drive sprocket 24 is rotated In the normal direction.

Meanwhile, when the user rotates the pedal 2 in a reversed direction, the reversed rotating force of the pedal 2 is transmitted to the pedal gear 22 through the pedal shaft 21, thus rotating the pedal shaft 22 in the same direction or the reversed direction as shown by the arrow "e" of FIG. 5. In such a case, the movable intermediate gear 25 is moved from the first position to the second position under the guide of the arcuate guide slot 25h of the fixed bracket 23, thus being brought into engagement with the internal teeth of the drive sprocket 24 without engaging With the fixed intermediate gear 26. At the second position, the movable intermediate gear 25, rotated in the normal direction, allows the drive sprocket 24 to be rotated in the normal direction as shown by the arrows of FIG. 5. In a brief description, when the pedal gear 22 is rotated in the reversed direction as shown by the arrow "e" of FIG. 5, the drive sprocket 24 is rotated in the normal direction.

The above reversible drive device does not affect a reversed rotating action of the rear wheel, thus allowing a user to easily move the bicycle backward That is, when the user moves the bicycle backward, the rear wheel hub shaft is rotated in a reversed direction, so the drive sprocket 24, connected to the driven sprocket through the chain, is rotated in the same direction or the reversed direction as shown by the arrow "f" of FIG. 5. In such a case, the movable shaft 25c, received in the arcuate guide slot 25h, is not operated in conjunction with the reversed rotating action of the drive sprocket 24, so the rear wheel hub shaft can be freely rotated in the reversed direction and allows the bicycle to be freely moved backward.

Therefore, the reversible drive device according to the second embodiment of this invention does not force a user to operate any lever when it is necessary to move a bicycle backward.

Figure 6:
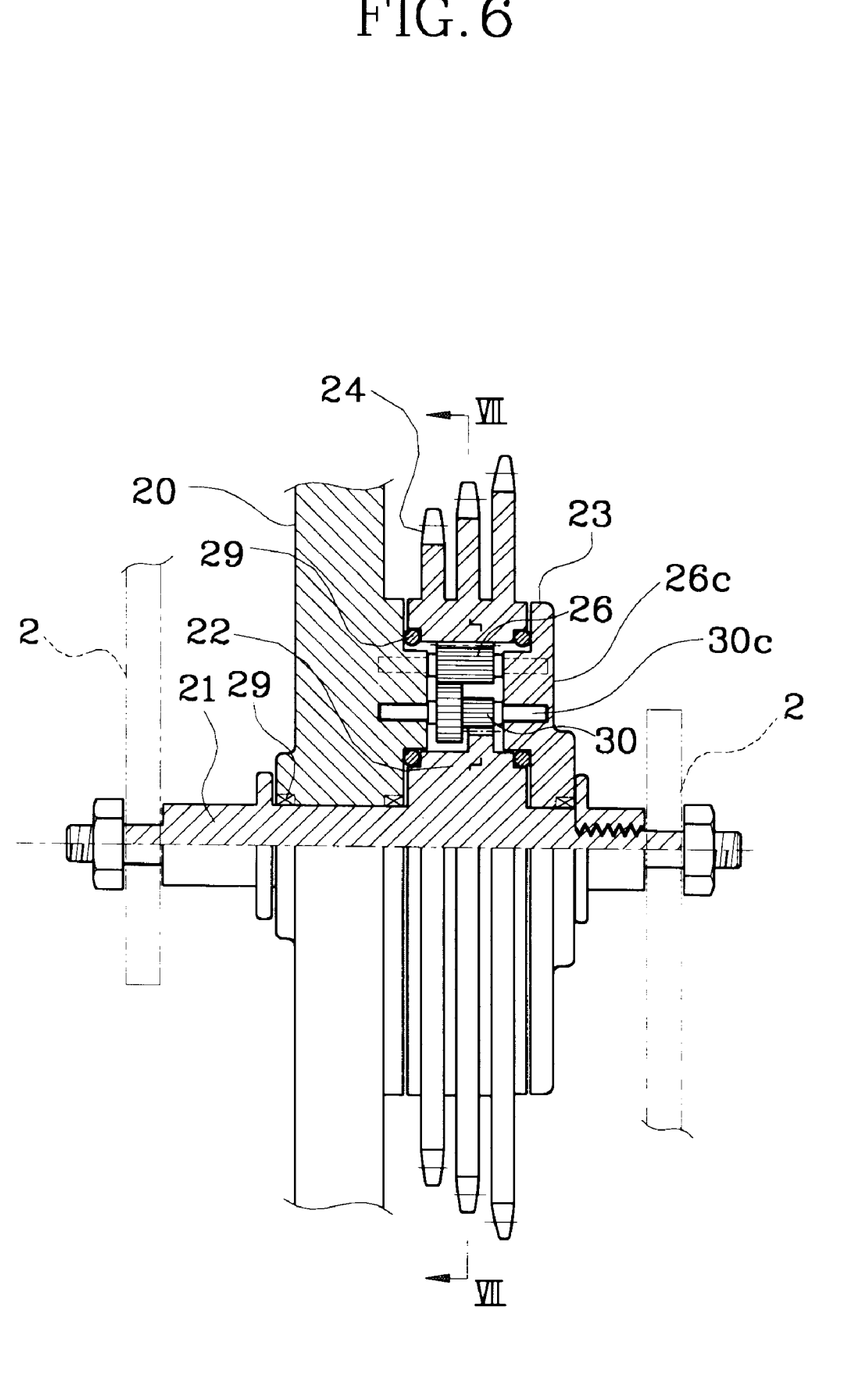
FIG. 6 is a partially sectioned view of a reversible drive device for bicycles in accordance with the third embodiment of the present invention, the drive device being provided with a movable intermediate gear which is shaped into a double gear.
Figure 7:
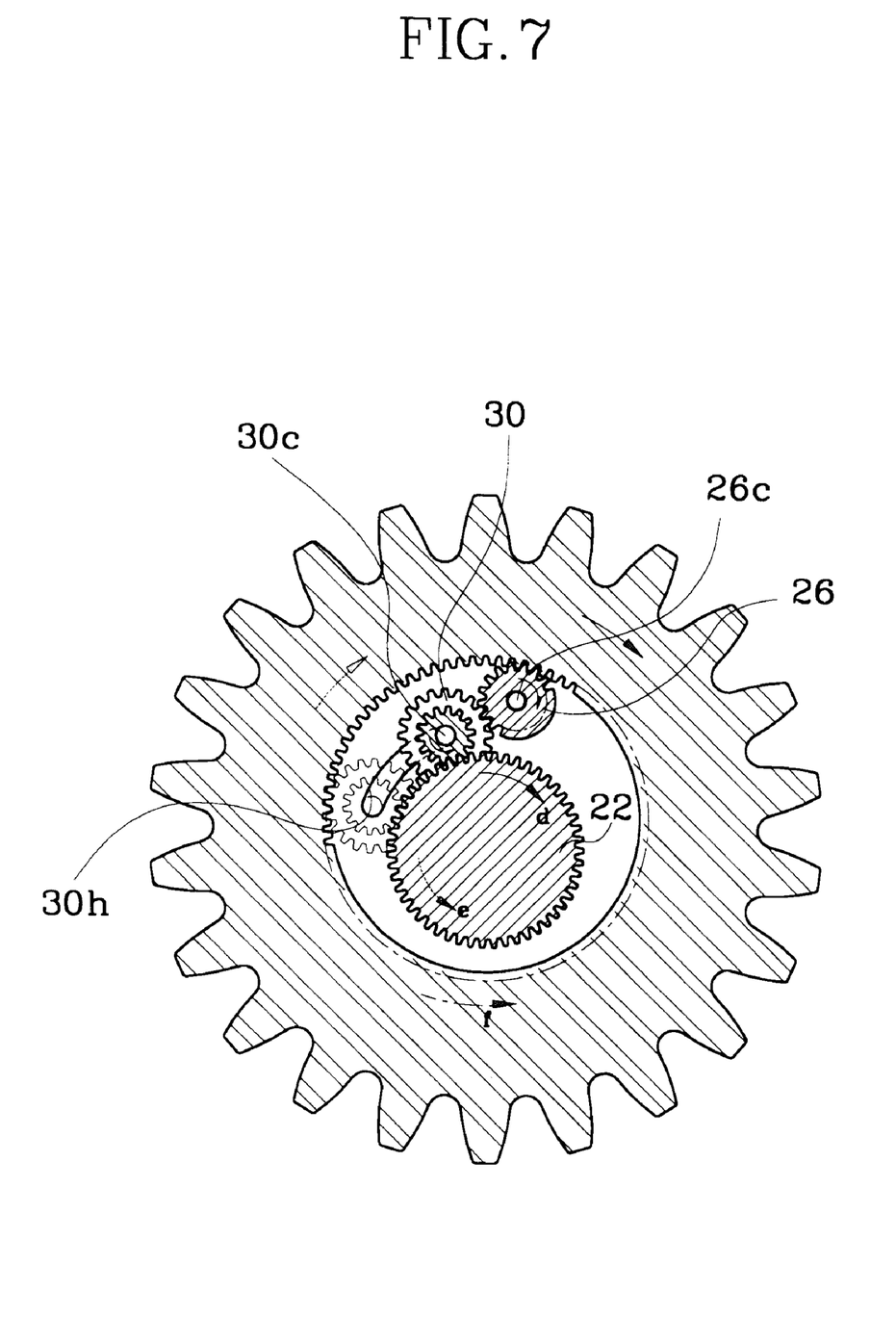
FIG. 7 is a sectional view of the above reversible drive device taken along the line VII—VII of FIG. 6.

FIG. 6 is a partially sectioned view of a reversible drive device for bicycles in accordance with the third embodiment of the present invention. FIG. 7 is a sectional view of the above reversible drive device taken along the line VII—VII of FIG. 6. In the third embodiment, the movable intermediate gear 30, with a movable shaft 30c, is shaped into a double gear. That is, the movable Intermediate gear 30 comprises two gears which have different diameters and are commonly and fixedly mounted to the shaft 30c. Such a movable intermediate gear 30 is capable of controlling the gear ratio between the pedal gear 22 and the drive sprocket 24, thus easily controlling the number of revolutions of the drive sprocket 24 relative to the pedal gear 22.

Figure 8:
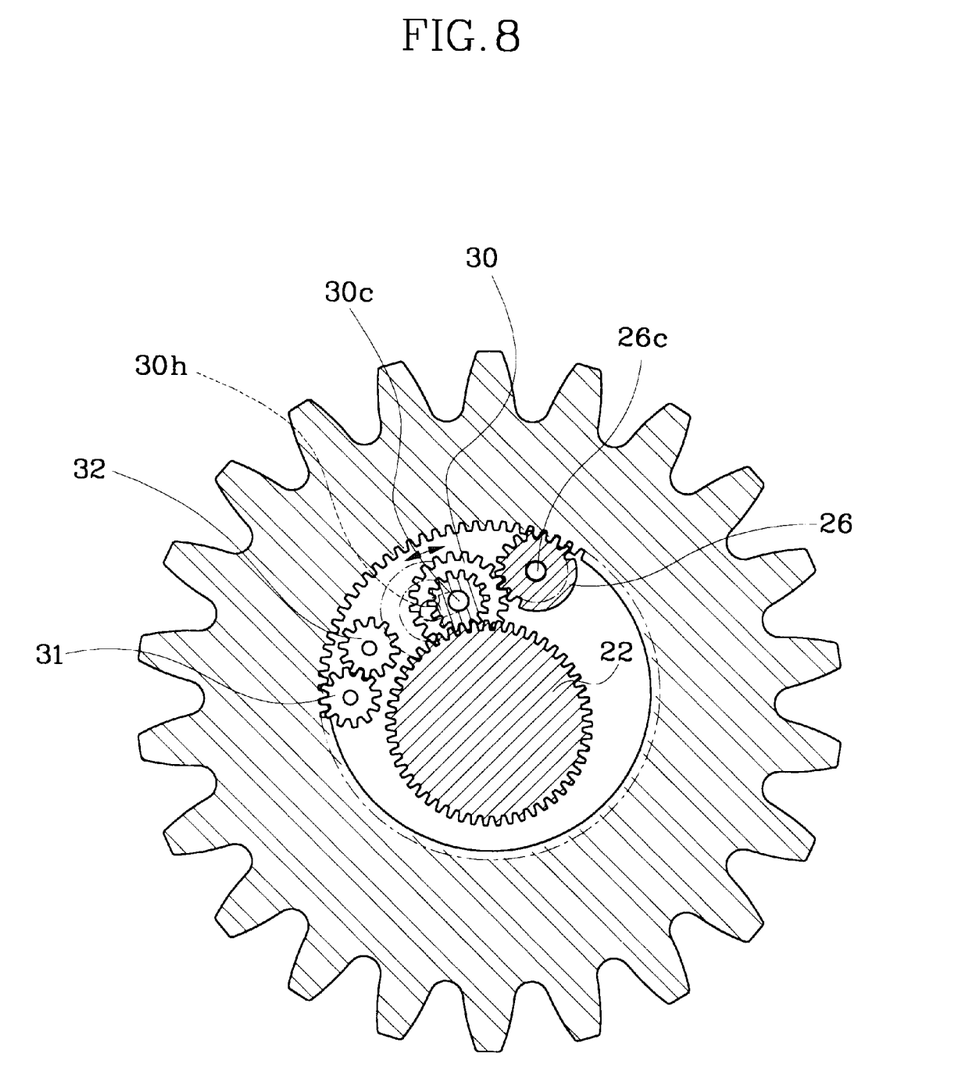
FIG. 8 is a partially sectioned view of a reversible drive device for bicycles in accordance with the fourth embodiment of the present invention, the drive device being provided with two additional fixed intermediate gears.

FIG. 8 is a partially sectioned view of a reversible drive device for bicycles in accordance with the fourth embodiment of the present invention. In the fourth embodiment, the drive device further comprises first and second additional intermediate gears 31 and 32, which individually have a fixed shaft. The first additional intermediate gear 31 is arranged in the eccentric gap between the pedal gear 22 and the drive sprocket 24 at a position opposite to the fixed intermediate gear 26 and always engages with the internal teeth of the drive sprocket 24. The second additional intermediate gear 32 is arranged in the above eccentric gap and always engages with the first additional intermediate gear 31 without engaging with the pedal gear 22 or the drive sprocket 24. The above second additional intermediate gear 32 is selectively brought into engagement with the movable intermediate gear 30 when the pedal gear 22 is rotated in a reversed direction.

Due to the two additional intermediate gears 31 and 32, the moving distance of the movable intermediate gear 30 is reduced, thus effectively reducing the moving time of the movable intermediate gear 30 when it is moved between the two positions.

Figure 9:
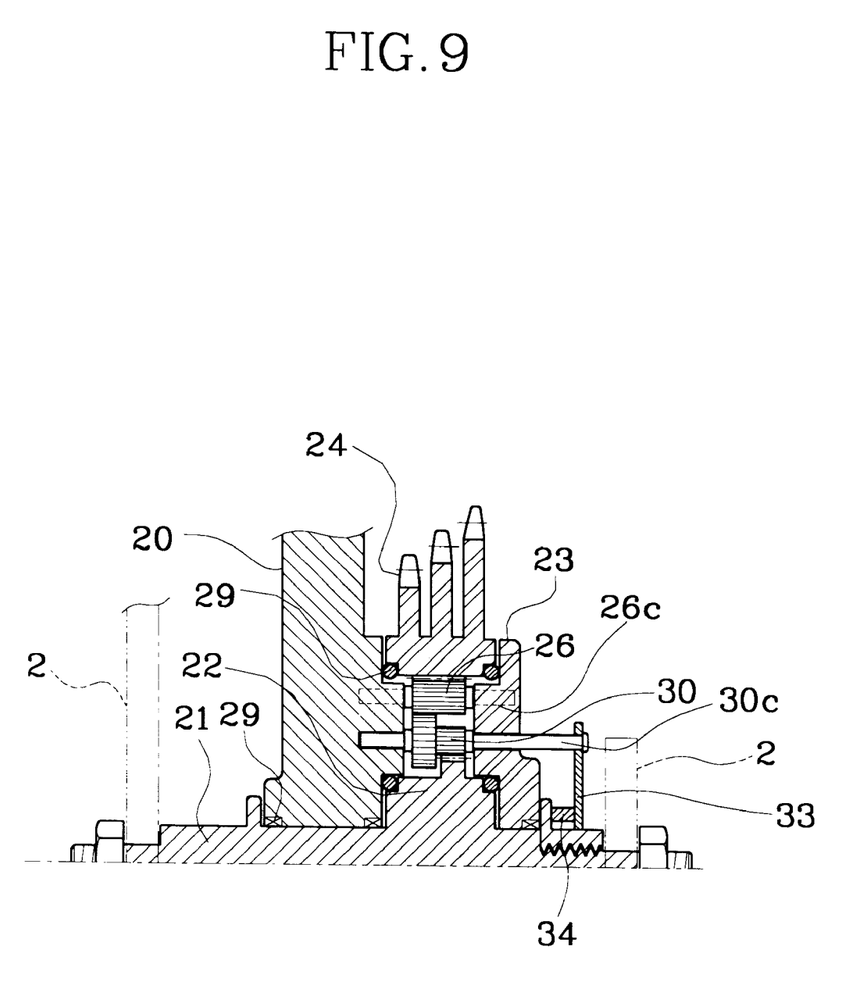
FIG. 9 is a sectional view of a reversible drive device for bicycles in accordance with the fifth embodiment of the present invention, the drive device being provided with a magnet coupled to the shaft of a movable intermediate gear.

FIG. 9 is a sectional view of a reversible drive device for bicycles in accordance with the fifth embodiment of the present invention In the fifth embodiment, the arcuate guide slot of the fixed bracket 23 is fully perforated, thus forming an arcuate guide slit 30$h$ while the shaft 30$c$ of the movable intermediate gear 30 is lengthened and Penetrates the guide slit 30$h$. A rod 33 is vertically mounted to the outside end of the shaft 30$c$, thus rotatably supporting the shaft 30$c$. Fixedly mounted to the lower end portion of the rod 33 is a magnet 34. The above magnet 34 also comes into contact with the pedal shaft 21, thus being designed to be rotated In the same direction as that of the pedal shaft 22 and allowing the shaft 30$c$ of the movable intermediate gear 30 to be more effectively movable.

In the reversible drive device of the present invention, the configuration of the gear tooth may be variously changed. Particularly, the gear tooth preferably has a rounded configuration capable of achieving a quick engagement of teeth and an effective power transmission.

INDUSTRIAL APPLICABILITY

As described above, the present invention provides a reversible drive device for bicycles, which allows a bicycle to go forward by a normal or reversed rotating force of a pedal without forcing a user to operate any lever, thus being convenient to the user riding on the bicycle. The drive device has a simple construction with a reduced number of parts, therby being produced through a simple process, improving productivity and reducing the production cost. The drive device also allows the rear wheel of a bicycle to be rotatable in a reversed direction, thus easily moving the bicycle backward. The drive device is integrated into a single assembly and is detachably attached to either the rear wheel hub shaft or a pedal shaft, so the device allows a user to easily repair or change the drive device and allows a bicycle manufacturer to easily manage the parts of bicycles, and improves work efficiency while producing the drive device. The drive device is provided with a means for effectively preventing the shaft holding yoke of a rear wheel fork from being unexpectedly opened, thereby improving durability of bicycles.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

We claim:

1. A reversible drive device for bicycles, comprising:
a driven sprocket detachably and rotatably installed at one side of a bicycle's rear wheel at a position spaced apart from the rear wheel, said driven sprocket being connected to a drive sprocket of a pedal through a chain and rotating the rear wheel using the rotating force of the pedal, and being shaped into a ring gear with internal and external teeth;

a hub shaft is fixed to the center of the rear wheel and rotatable fitted over a fixed shaft, thus rotatable supporting the rear wheel on the fixed shaft;

a rear wheel gear detachably held on said hub shaft so as to be rotatable around the fixed shaft along with the hub shaft, said rear wheel gear being eccentrically arranged in a concentric cavity of the driven sprocket with an eccentric gap being formed between the rear wheel gear and the driven sprocket, said rear wheel gear thus transmitting the rotating force of the driven sprocket to the rear wheel;

a fixed intermediate gear having a fixed shaft and arranged in said eccentric gap and always engaging with the external teeth of the rear wheel gear;

a movable intermediate gear having a movable shaft and arranged in said eccentric gap in a way such that the movable intermediate gear always engages with the internal teeth of the driven sprocket and is movable between two positions: a first position where the movable intermediate gear engages with both the driven sprocket and the fixed intermediate gear so as to rotate the rear wheel gear in a normal direction, and a second position where the movable intermediate gear engages with both the driven sprocket and the rear wheel gear so as to rotate the rear wheel gear in the normal direction, said movable intermediate gear being placed at said first position when the driven sprocket is rotated in the normal direction due to a normal rotating force of the pedal, and being placed at the second position when the driven sprocket is rotated in a reversed direction due to a reversed rotating force of the pedal; and a fixed bracket having an arcuate guide slot on the inside surface and fixedly mounted to said fixed shaft of the rear wheel, and holding the rear wheel gear, the driven sprocket and the two intermediate gears, said guide slot being exposed to said eccentric gap and having the same radius of curvature as that of an internally toothed surface of said driven sprocket and movably holding the movable shaft of said movable intermediate gear, thus allowing the movable intermediate gear to be movable between the first and second positions in accordance with a rotating direction of the driven sprocket.

2. The reversible drive device according to claim 1, wherein said driven sprocket is formed as a sprocket assembly with a plurality of sprockets having different diameters, thus allowing the rotating speed of said pedal to be changeable when the rotating force of the pedal is transmitted to the driven sprocket.

3. The reversible drive device according to claim 1, wherein each end of said fixed shaft is partially depressed at the center, thus forming a yoke seat having two crescent stoppers at diametrically opposite positions, said crescent stoppers preventing a shaft holding yoke of a rear wheel fork from being unexpectedly opened.

4. A reversible drive device for bicycles, comprising:
a drive sprocket detachably and rotatably installed at one side of a pedal shaft at a position spaced apart from the pedal shaft, said drive sprocket being connected to a driven sprocket of a rear wheel through a chain and rotating the rear wheel using the rotating force of a pedal, and being shaped into a ring gear with internal and external teeth;

a pedal gear detachably held on said pedal shaft so as to be rotatable along with the pedal shaft, said pedal gear being eccentrically arranged in a concentric cavity of the drive sprocket with an eccentric gap being formed between the pedal gear and the drive sprocket, said pedal gear thus transmitting the rotating force of the pedal shaft to the drive sprocket;

a fixed intermediate gear having a fixed shaft and arranged in said eccentric gap and always engaging with the internal teeth of the drive sprocket;

a movable intermediate gear having a movable shaft and arranged in said eccentric gap in a way such that the movable intermediate gear always engages with the external teeth of the pedal gear and is movable between two positions a first position where the movable intermediate gear engages with both the pedal gear and the fixed intermediate gear so as to rotate the drive sprocket in a normal direction, and a second position where the movable intermediate gear engages with both the pedal gear and the internal teeth of said drive sprocket so as to rotate the drive sprocket in the normal direction, said movable intermediate gear being placed at said first position when the pedal gear is rotated in the normal direction due to a normal rotating force of the pedal, and being placed at the second position when the pedal gear is rotated in a reversed direction due to a reversed rotating force of the pedal; and a fixed bracket having an arcuate guide slot on the inside surface and fixedly mounted to said pedal shaft, and holding the pedal gear, the drive sprocket and the two intermediate gears, said guide slot being exposed to said eccentric gap and having the same radius of curvature as that of an externally toothed surface of said pedal gear and movably holding the movable shaft of said movable intermediate gear, thus allowing the movable intermediate gear to be movable between the first and second positions in accordance with a rotating direction of the pedal gear.

5. The reversible drive device according to claim 4, wherein said drive sprocket is formed as a sprocket assembly with a plurality of sprockets having different diameters, thus allowing the rotating speed of said pedal to be changeable when the rotating force of the pedal is transmitted to the driven sprocket.

6. The reversible drive device according to claim 4, wherein said movable intermediate gear consists of two gears having different diameters and being commonly and fixedly mounted to the movable shaft.

7. The reversible drive device according to claim 4, further comprising:

first additional intermediate gear having a fixed shaft and arranged in said eccentric gap at a position opposite to the fixed Intermediate gear, and always engaging with the internal teeth of the drive sprocket; and a second additional intermediate gear having a fixed shaft and arranged in said eccentric gap, and always engaging with the first additional intermediate gear without engaging with the pedal gear or the drive sprocket, said second additional intermediate gear being selectively brought into engagement with the movable intermediate gear when the pedal gear is rotated in the reversed direction.

8. The reversible drive device according to claim 4, wherein the arcuate guide slot of said fixed bracket is fully perforated, thus forming an arcuate guide slit; the movable shaft of the movable intermediate gear is lengthened and penetrates the arcuate guide slit with a rod being vertically mounted to an outside end of said movable shaft so as to rotatably support the movable shaft; and a magnet is fixedly mounted to a lower end portion of said rod and comes into contact with the pedal shaft, thus being rotatable in the same direction as that of the pedal shaft and allowing the movable shaft of the movable intermediate gear to be more effectively movable.

\* \* \* \* \*